US012499716B2

(12) United States Patent
Paulsson et al.

(10) Patent No.: US 12,499,716 B2
(45) Date of Patent: Dec. 16, 2025

(54) SYSTEM AND METHOD FOR CONTROLLING THE OPERATION OF A DOOR

(71) Applicant: Assa Abloy Entrance Systems AB, Landskrona (SE)

(72) Inventors: Stefan Paulsson, Odakra (SE); Patrik Lerpard, Limhamn (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 1035 days.

(21) Appl. No.: 17/619,673

(22) PCT Filed: Jun. 17, 2020

(86) PCT No.: PCT/EP2020/066691
§ 371 (c)(1),
(2) Date: Dec. 16, 2021

(87) PCT Pub. No.: WO2020/260084
PCT Pub. Date: Dec. 30, 2020

(65) Prior Publication Data
US 2022/0307315 A1 Sep. 29, 2022

(30) Foreign Application Priority Data
Jun. 24, 2019 (SE) .................................... 1930220-7

(51) Int. Cl.
*G07C 3/04* (2006.01)

(52) U.S. Cl.
CPC .......... *G07C 3/04* (2013.01); *E05Y 2400/458* (2013.01); *E05Y 2900/132* (2013.01)

(58) Field of Classification Search
CPC ............ E05F 15/70; E05F 15/71; E05F 15/77
See application file for complete search history.

(56) References Cited

U.S. PATENT DOCUMENTS

| | | | | |
|---|---|---|---|---|
| 6,933,843 | B1 * | 8/2005 | Hom | E05F 15/611<br>340/5.71 |
| 10,352,084 | B2 * | 7/2019 | Hovel | E05F 15/70 |

(Continued)

FOREIGN PATENT DOCUMENTS

| | | |
|---|---|---|
| CN | 107120021 | 9/2017 |
| DE | 3007470 | 9/1981 |

(Continued)

OTHER PUBLICATIONS

International Search Report in PCT/EP2020/066691 mailed Oct. 8, 2020.
Swedish Search Report in 1930220-7 mailed Jan. 24, 2020.

*Primary Examiner* — Allen R. B. Schult
(74) *Attorney, Agent, or Firm* — Wissing Miller LLP

(57) ABSTRACT

A system, method and computer program product for controlling the operation of a door (1) to a room, the method comprising (S1) obtaining at least a first air pressure data (1*ap*) based on an air pressure on the inside of the door (1), (S2) obtaining at least a second air pressure data (2*ap*) based on the air pressure on the outside of the door (1), and (S5) determining at least a first air pressure difference data (1*apdd*) based on the difference between the at least first air pressure data (1*ap*) and the at least second air pressure data (2*ap*), and in a determination that the at least first air pressure difference data (1*apdd*) is outside of a predefined value, or a predefined value interval, generate a control signal (CS) for controlling the operation of the door (1).

13 Claims, 3 Drawing Sheets

(56) References Cited

U.S. PATENT DOCUMENTS

| | | | |
|---|---|---|---|
| 2013/0324026 | A1 | 12/2013 | Fiorita |
| 2018/0155975 | A1 | 6/2018 | Kempfle |

FOREIGN PATENT DOCUMENTS

| | | | | | |
|---|---|---|---|---|---|
| DE | 19607918 | | | 9/1997 | |
| DE | 19828332 | | | 12/1999 | |
| DE | 102013103320 | | | 10/2014 | |
| DE | 102013103320 | A1 | * | 10/2014 | .............. E05F 15/70 |
| EP | 0799962 | | | 10/1997 | |
| EP | 3348767 | | | 7/2018 | |
| EP | 3348767 | A1 | * | 7/2018 | .............. E05F 15/77 |

* cited by examiner

SYSTEM AND METHOD FOR CONTROLLING THE OPERATION OF A DOOR

This application is a 371 of PCT/EP2020/066691, filed on Jun. 17, 2020, published on Dec. 30, 2020 under publication number WO 2020/260084, which claims priority benefits from Swedish Patent Application No. 1930220-7, filed on Jun. 24, 2019, the disclosure of which is incorporated herein by reference.

TECHNICAL FIELD

The disclosure pertains to the field of controlling the operation of a door to a sealed room.

BACKGROUND

Today there are a plurality of different rooms that needs to be sealed for different reasons. A common reason is to prevent air to leak between the spaces that the door separates when it is closed. The seal prevents e.g. a change of temperature between the spaces. There are also rooms that needs to be sealed for other reasons. A sealed room with minimum or no air leakage is often referred to as an airtight room, a hermetic room or a clean room etc. These sealed rooms are often designed to maintain extremely low levels of particulates, such as dust, airborne organisms, or vaporized particles. An example of a sealed room is a surgery room at a hospital, where surgical operations are carried out in an aseptic environment. There are also other environments with similar requirements such as hermetic rooms for electronic and health care products. A sealed room has often at least one door to access the room. The door also needs to be sealed in order to seal the room when the door is closed. There are also sealed rooms that have a higher air pressure inside of the sealed room compare to the air pressure outside of the sealed room. A reason for having a higher air pressure inside of the sealed room is to hinder particulates, such as dust, airborne organisms, or vaporized particles etc. to enter the sealed room due to that the air flow, if any, is in the direction from the sealed room to the outside of the sealed room. Today doors to a sealed room are maintained in order to ensure that they function as expected. Doors to sealed rooms are used under different conditions and sometimes it can be difficult to predict when a certain door needs maintenance. It can also be difficult to ensure that a certain door functions as expected in order to keep the room behind the door sealed with no or minimum air leakage.

SUMMARY

Today it is sometimes not so easy to know if a door is functioning as predicted, in particular to know if the door is making the room behind the door sealed. The door may leak air due to an old or worn door seal that needs to be replaced. The door seal may be worn due to e.g. different air pressure over time, and the number of times the door has been exposed to different air pressure, or e.g. due to that the door seal is outdated. Today it is difficult to predict when a door needs maintenance, e.g. when a door seal needs to be replaced. A door may also leak air due to that the air pressure inside of the room behind the door is not as expected compare to the air pressure outside of the room. This can also lead to a leak of air and that the door is not functioning as predicted.

There is a demand for an easier and more reliable way to control the function and operation of a door, in particular a door to a sealed room. There is also a need for controlling the opening and closing of a door, and a need for predicting maintenance of the door. An object of the present disclosure is to provide a system, method and computer program product for controlling the operation of a door to a room which seek to mitigate, alleviate, or eliminate one or more of the above-identified deficiencies in the art and disadvantages singly or in any combination.

The disclosure proposes a door operation management system for controlling the operation of a door to a room. The door operation management system comprises at least a first sensor device configured to obtain at least a first air pressure data based on the air pressure on the inside of a door and at least a second air pressure data based on the air pressure on the outside of the door, wherein the door is separating the room from a second room. The door operation management system further comprises a processing circuitry operatively connected to the at least first sensor device configured to cause the door operation management system to obtain the at least first air pressure data based on the air pressure on the inside of a door. The processing circuitry is further configured to obtain the at least second air pressure data based on the air pressure on the outside of the door and determine at least a first air pressure difference data based on the difference between the at least first air pressure data and the at least second air pressure data, and in a determination that the at least first air pressure difference data is outside of a predefined value, or a predefined value interval, generate a control signal for controlling the operation of the door. An advantage is hence that dependent on the air pressure on the outside of the door and the air pressure on the inside of the door the function of the door can be predicted and if the difference in the air pressure between the inside of the door and the air pressure of the outside of the door is outside of a desired value, the control signal can be used for controlling and/or confirming the function of the door.

According to an aspect, the processing circuitry is further configured to cause the door operation management system to store at least any of the at least first air pressure data, the at least second air pressure data and the at least first air pressure difference data together with a time stamp data in a memory. This means among others that the data can be used for processing at a later point of time, and i.e. that a history of how the air pressure has been affecting the door over time becomes available.

According to an aspect the processing circuitry is further configured to cause the door operation management system to determine the total time, or the number of times, the door has been exposed to at least any of the at least first air pressure data, the at least second air pressure data and the at least first air pressure difference data, and in a determination that the total time, or the number of times, exceeds a predefined time value or a predefined number of times value, generate a maintenance signal for indicating a need for maintenance of the door. In other words, it can be predicted how the door is worn, e.g. the number of times the door has been opened and closed, and the number of times the door has been affected by an air pressure that is e.g. above a certain value. This information is valuable for planning maintenance of the door, e.g. when it is time to change or service the seal that is making the door air tight, in order to secure that the door is always functioning as expected.

According to an aspect the processing circuitry is further configured to cause the door operation management system to obtain an indication of an open state or a closed state of the door and in accordance with a determination that the door is in an open state, use the control signal to generate an alarm for alerting that the door is open, and in accordance with a determination that the door is in a closed state, use the control signal to generate a maintenance signal for indicating a need for maintenance of the door. This means that when the control signal is generated, due to that the at least first air pressure difference data is outside of a predefined value, or a predefined value interval, the open state or closed state gives a further understanding of if an alarm should be generated, e.g. to alert users in the room that the door is not closed, or if a maintenance signal should be generated in order to indicate a need to make maintenance of the door, e.g. to verify if the seal is functioning or need to be replaced.

According to an aspect the processing circuitry is further configured to cause the door operation management system to send the control signal to a door actuator device configured to close and/or open the door. An advantage with this aspect is that the door can then automatically be made more air tight by the door actuator device e.g. by automatically applying a close operation onto the door, e.g. by motors closing the door, when the door actuator device receives the control signal.

According to an aspect the processing circuitry is further configured to cause the door operation management system to determine, based on the at least first air pressure data and the at least second air pressure data, a relative force applied onto the door, for controlling the door actuator device to close and/or open the door dependent on the relative force. In other words, by knowing the relative force, e.g. either applied from the inside of the door or from the outside of the door, the door actuator device can be instructed to use a certain torque or a certain power to close and/or open the door. This can be used to save energy but also to make the user experience of the operation of the door more smooth.

According to an aspect the door operation management system comprises a plurality of doors and each door is connected to the door operation management system via a communication network. This means that a plurality of doors can be managed by the same door operation management system which enables a flexible configuration of plural doors.

According to an aspect the control signal configured to be received by a facility management system for controlling the ventilation of the room. The advantage with this aspect is that e.g. the ventilation of the room, where the door is used, can be controlled with knowledge of the air pressure on the outside of the door and the air pressure on the inside of the door.

The disclosure further proposes a method for controlling the operation of a door to a room. The method comprising the step of obtaining at least a first air pressure data based on an air pressure on the inside of the door, the step of obtaining at least a second air pressure data based on the air pressure on the outside of the door. The method further comprising the step of determining at least a first air pressure difference data based on the difference between the at least first air pressure data and the at least second air pressure data, and in a determination that the at least first air pressure difference data is outside of a predefined value, or a predefined value interval, generate a control signal for controlling the operation of the door. An advantage is hence that dependent on the air pressure on the outside of the door and the air pressure on the inside of the door the function of the door can be predicted and if the difference in the air pressure between the inside of the door and the air pressure of the outside of the door is outside of a desired value, the control signal can be used for controlling and/or confirming the function of the door.

According to an aspect the method further comprising the step of storing at least any of the at least first air pressure data, the at least second air pressure data and the at least first air pressure difference data together with a time stamp data in a memory. This means among others that the data can be used for processing at a later point of time, and i.e. that a history of how the air pressure has been affecting the door over time becomes available.

According to an aspect the method further comprising the step of determining the total time, or the number of times, the door has been exposed to at least any of the at least first air pressure data, the at least second air pressure data and the at least first air pressure difference data, and in a determination that the total time, or the number of times, exceeds a predefined time value or a predefined number of times value, generate a maintenance signal for indicating a need for maintenance of the door. In other words, it can be predicted how the door is worn, e.g. the number of times the door has been opened and closed, and the number of times the door has been affected by an air pressure that is e.g. above a certain value. This information is valuable for planning maintenance of the door, e.g. when it is time to change or service the seal that is making the door air tight, in order to secure that the door is always functioning as expected.

According to an aspect the method further comprising the step of obtaining an indication of an open state or a closed state of the door and in accordance with a determination that the door is in an open state, use the control signal to generate an alarm for alerting that the door is open, and in accordance with a determination that the door is in a closed state, use the control signal to generate a maintenance signal for indicating a need for maintenance of the door. This means that when the control signal is generated, due to that the at least first air pressure difference data is outside of a predefined value, or a predefined value interval, the open state or closed state gives a further understanding of if an alarm should be generated, e.g. to alert users in the room that the door is not closed, or if a maintenance signal should be generated in order to indicate a need to make maintenance of the door, e.g. to verify if the seal is functioning or need to be replaced.

According to an aspect the method further comprising the step of sending the control signal to a door actuator device configured to close and/or open the door. An advantage with this aspect is that the door can then automatically be made more air tight by the door actuator device e.g. by automatically applying a close operation onto the door, e.g. by motors closing the door, when the door actuator device receives the control signal.

According to an aspect the method further comprising the step of determining, based on the at least first air pressure data and the at least second air pressure data, a relative force applied on the door for controlling the door actuator device to close and/or open the door. In other words, by knowing the relative force, e.g. either applied from the inside of the door or from the outside of the door, the door actuator device can be instructed to use a certain torque or a certain power to close and/or open the door. This can be used to save energy but also to make the user experience of the operation of the door more smooth.

The disclosure further proposes a computer program product comprising a non-transitory computer readable medium, having thereon a computer program comprising program instructions, the computer program being loadable into a processing circuitry and configured to cause execution of the method when the computer program is run by the at least one processing circuitry.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1A:
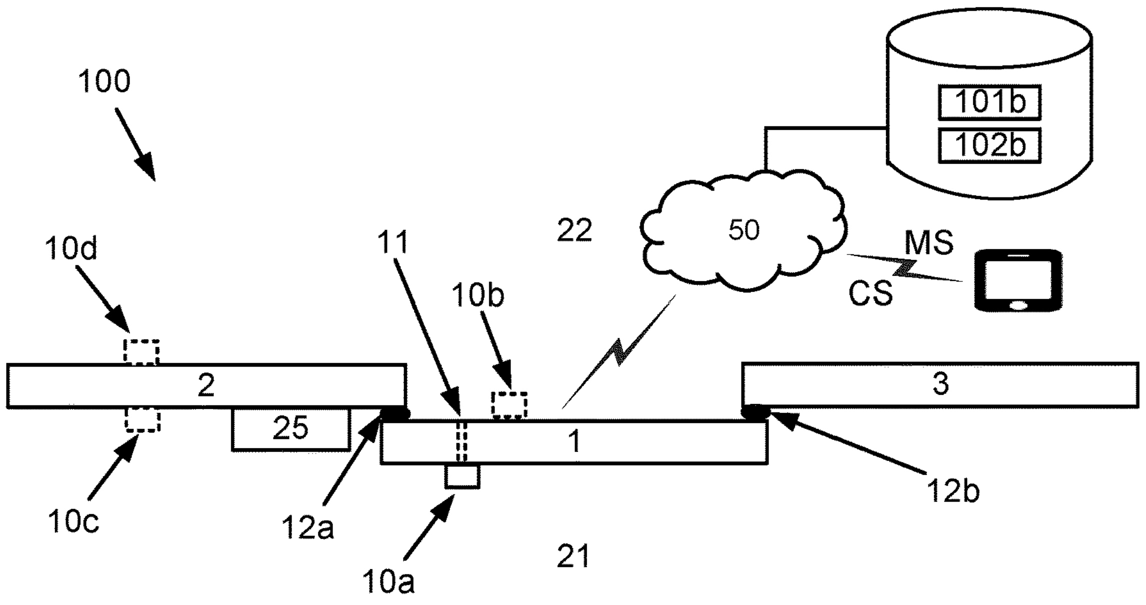
FIG. 1*a* illustrates a door operation management system, a door and walls, as seen from above, according to an aspect of the disclosure.

Aspects of the present disclosure will be described more fully hereinafter with reference to the accompanying drawings. The method and device disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Today it is sometimes not so easy to know if a door is functioning as predicted, in particular to know if the door is making the room behind the door sealed. The door may leak air due to an old or worn door seal that needs to be replaced. The door seal may be worn due to e.g. different air pressure over time, and the number of times the door has been exposed to different air pressure, or e.g. due to that the door seal is outdated. Today it is difficult to predict when a door needs maintenance, e.g. when a door seal needs to be replaced. A door may also leak air due to that the air pressure inside of the room behind the door is not as expected in comparison to the air pressure outside of the room. This can also lead to a leak of air and that the door is not functioning as predicted.

There is a demand for an easier and more reliable way to control the function and operation of a door, in particular a door to a sealed room. There is also a need for controlling the opening and closing of a door, and a need for predicting maintenance of the door. An object of the present disclosure is to provide a system, method and computer program product for controlling the operation of a door to a room which seek to mitigate, alleviate, or eliminate one or more of the above-identified deficiencies in the art and disadvantages singly or in any combination.

Figure 1B:
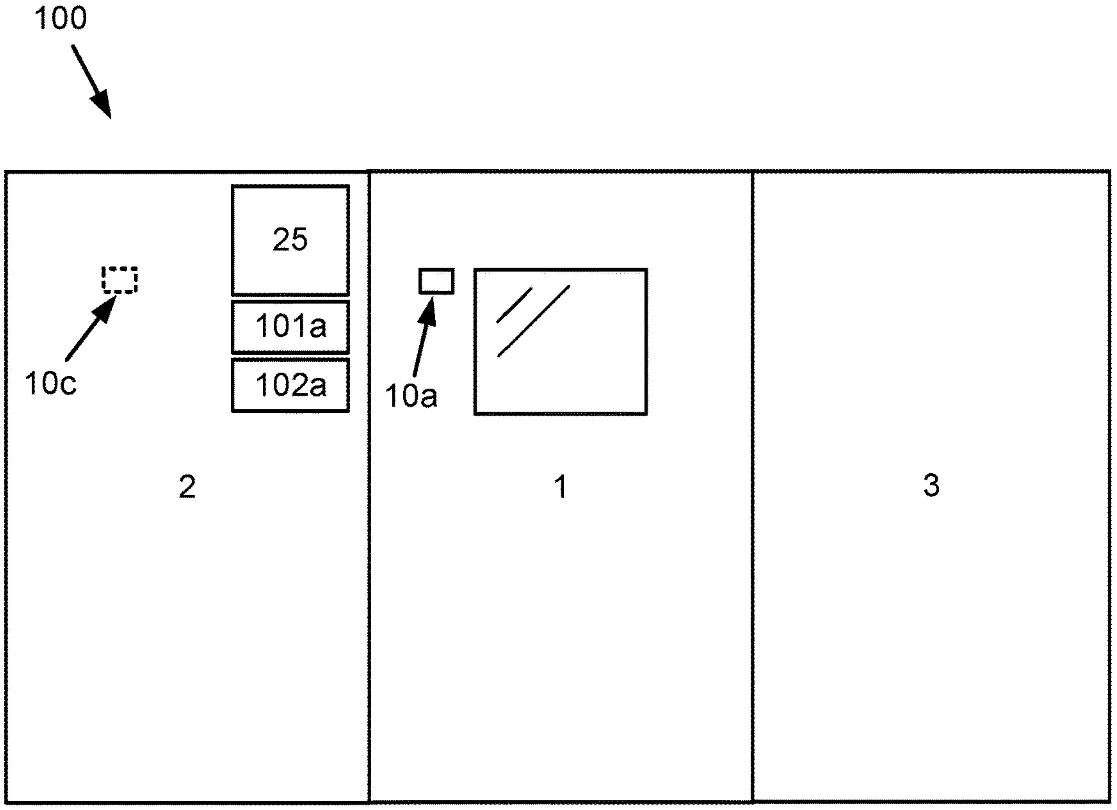
FIG. 1*b* illustrates a door operation management system, a door and walls, as seen from the side, according to an aspect of the disclosure.

As illustrated in FIGS. 1*a* and 1*b*, the disclosure proposes a door operation management system 100 for controlling the operation of a door 1 to a room 21. FIG. 1*a* illustrates a door operation management system 100, a door 1 and walls 2,3 as seen from above, according to an aspect of the disclosure. FIG. 1*a* does not illustrate a doorframe, however, it is understood that in order to prevent leakage of air, the door 1 does not only need to be airtight on the sides towards the walls 2,3, as illustrated in FIG. 1*a*, but also at the top and bottom of the door 1, e.g. by e.g. a doorframe, further walls and/or a threshold. Even if not illustrated in the figures it is understood that the door 1 can be configured to open and close using common door configurations. According to an aspect the door 1 is at least any of a sliding door, a swing door or a foldable door. In one example the door is configured to be sealed when closed, using the weight of the door. In one example the door is configured to be sealed when closed using common door locks.

FIG. 1*b* illustrates a door operation management system, a door 1 and walls 2,3 as seen from the side, according to an aspect of the disclosure. The illustrations in FIGS. 1*a* and 1*b* only illustrates parts of walls 2,3, but it is understood that the walls 2,3 continues and connects to other walls or doors and encapsulates the room 21 together with a floor and ceiling, in order to make the room 21 an airtight sealed room.

According to an aspect at least a first seal 12*a*, 12*b*, as illustrated in FIG. 1*a*, is arranged on the door 1 for making the door 1 airtight in a closed position. According to an aspect the at least first seal 12*a*, 12*b* is arranged between on the door 1 to make the door 1 airtight in a closed position. According to an aspect the at least first seal 12*a*, 12*b* is arranged between the door 1 and a doorframe in order to make the door 1 airtight in a closed position. The at least first seal 12*a*, 12*b* prevents leakage of air between the door 1 and the wall 2,3 and/or the doorframe. The at least first seal 12*a*, 12*b* is typically made of rubber, plastic, a mix of plastic and rubber, textile, silicone, or any resilient material that prevents air from leaking between the door 1 and the wall 2,3. The seal of a door is worn and sometimes needs to be replaced or repaired in order to prevent leakage of air. As illustrated in FIG. 1*a*, the door 1 is equipped at least a first seal 12,*a*, 12*b*.

The door operation management system 100 comprises at least a first sensor device 10*a*, 10*b*, 10*c*, 10*d*. As illustrated in FIG. 1*a*, a first sensor device 10*a* is arranged on the inside of the door 1. In FIG. 1*a*, further example sensor devices 10*b*, 10*c*, 10*d* are illustrated. In FIG. 1*a*, a second sensor device 10*b* is arranged on the outside of the door 1, a third sensor device 10*c* is in the room 21 arranged on the wall 2, and a fourth sensor device 10*d* is in the second room 22 and arranged on the wall 2.

The at least a first sensor device 10*a*, 10*b*, 10*c*, 10*d* is configured to obtain at least a first air pressure data 1*ap* based on the air pressure on the inside of a door 1 and at least a second air pressure data 2*ap* based on the air pressure on the outside of the door 1, wherein the door 1 is separating the room 21 from a second room 22. According to an aspect the at least a first sensor device 10*a*, 10*b*, 10*c*, 10*d* is any of a pressure meter, a pressure gauge or a vacuum gauge. The air pressure data is typically in units of force per unit of a surface area.

In FIG. 1*a* the first sensor device 10*a* is arranged to obtain at least a first air pressure data 1*ap* based on the air pressure on the inside of a door 1 where the first sensor device 10*a* is located. According to an aspect, as illustrated in FIG. 1*a*, an air channel 11 is providing the first sensor device 10*a* to come in contact with the air pressure on the outside of the door 1. In an example the first sensor device 10*a* is arranged inside the door 1 and configured to obtain at least a first air pressure data 1*ap* based on the air pressure on the inside of a door 1 and to obtain at least a second air pressure data 2*ap* based on the air pressure on the outside of the door 1. According to an aspect a first sensor device 10*a* is used to obtain at least a first air pressure data 1*ap* based on the air pressure on the inside of a door 1 together with a second sensor device 10*b* that is used to obtain at least a second air pressure data 2*ap* based on the air pressure on the outside of the door 1. In one example a third sensor device 10*c* is used to obtain at least a third air pressure data 3*ap* based on the air pressure on the inside of a door 1 and fourth sensor device 10*d* is used to obtain at least a fourth air pressure data 4*ap* based on the air pressure on the outside of the door 1. A plurality of sensor devices may be desired in order to have a redundant system but also to have a more secure measurement of the air pressure.

The door operation management system 100 further comprises a processing circuitry 102*a*, 102*b* operatively connected to the at least first sensor device 10*a*, 10*b*, 10*c*, 10*d*. According to an aspect the processing circuitry 102*a*, 102*b* is operatively connected to the at least first sensor device 10*a*, 10*b*, 10*c*, 10*d* via a communication network 50. According to an aspect the processing circuitry 102*a*, 102*b* is a local processing circuitry 102*a* installed in the vicinity of the door 1. According to an aspect the processing circuitry 102*a*, 102*b* is a remote processing circuitry 102*b* connected to the at least first sensor device 10*a*, 10*b*, 10*c*, 10*d* via the communication network 50.

The communication network 50 is illustrated in FIG. 1*a*. In one example the communication network 50 is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-Internet of Things, NB-IoT, Third Generation, 3G, Fourth Generation, 4G, Fifth Generation 5G, Worldwide Interoperability for Microwave Access, WiMAX or Ultra Mobile Broadband, UMB or similar network. In one example the communication network 50 is a standardized wireless local area network such as a Wireless Local Area Network, WLAN, Bluetooth™, ZigBee, Ultra-Wideband, Near Field Communication, NFC, Radio Frequency Identification, RFID, or similar network.

The communication network 50 can also be a combination of both a local area network and a wide area network. The communication network 50 can also be wired networks. According to an aspect of the disclosure, the communication network 50 is defined by common Internet Protocols.

The processing circuitry 102*a*, 102*b* is configured to cause the door operation management system 100 to obtain the at least first air pressure data 1*ap* based on the air pressure on the inside of a door 1. The processing circuitry 102*a*, 102*b*, 102 is further configured to obtain the at least second air pressure data 2*ap* based on the air pressure on the outside of the door 1.

Figure 2A:
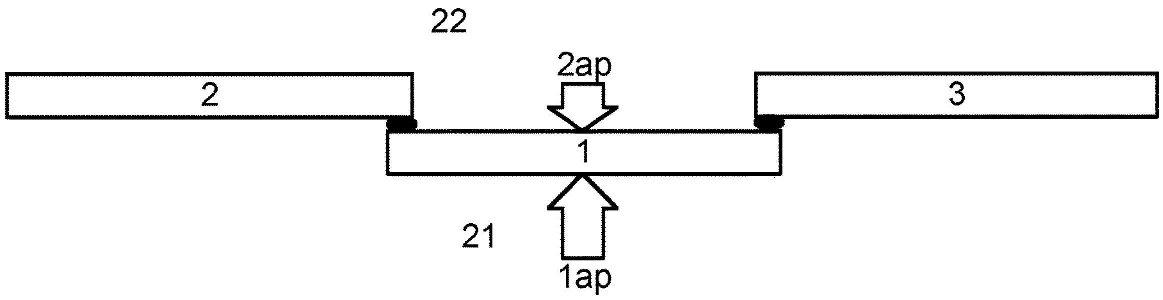
FIG. 2*a* illustrates a door with a certain air pressure on the outside of the door and with a certain air pressure on the inside of the door that causes no leakage of air.
Figure 2B:
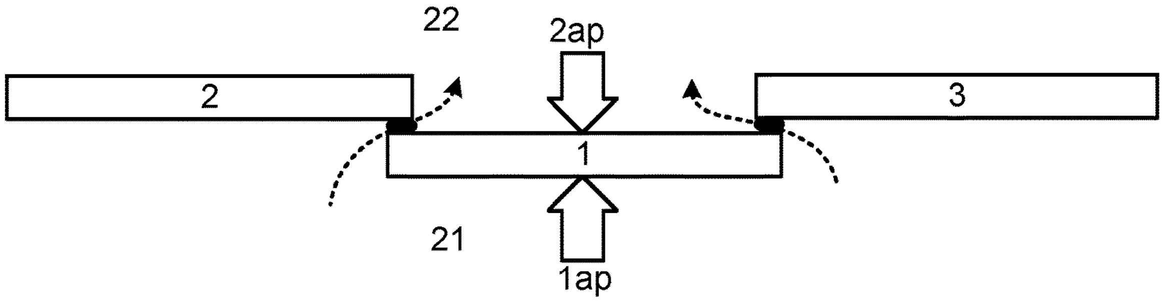
FIG. 2*b* illustrates a door with a certain air pressure on the outside of the door and with a certain air pressure on the inside of the door that causes some leakage of air.
Figure 2C:
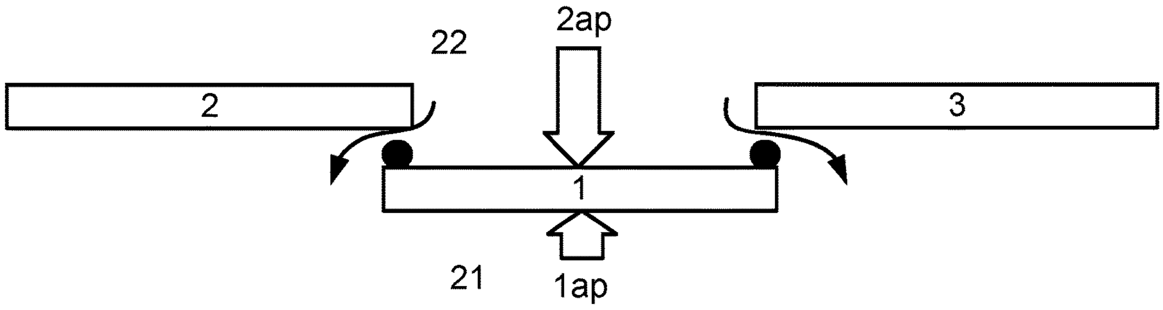
FIG. 2*c* illustrates a door with a certain air pressure on the outside of the door and with a certain air pressure on the inside of the door that causes leakage of air.
Figure 2D:
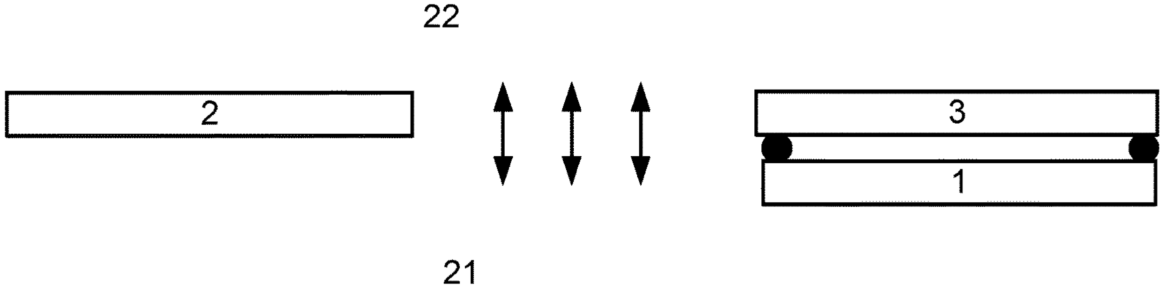
FIG. 2*d* illustrates a door in an open position that causes an unlimited flow of air.

The FIGS. 2*a*-2*c* illustrates different air pressures applied onto the door 1 from the inside of the door 1 and from the outside of the door 1. The different air pressures are illustrated with arrows in the FIGS. 2*a*-2*c*, having a size that correlates to the example air pressures. FIG. 2*a* illustrates a door 1 with a certain air pressure on the outside of the door 1 and with a certain air pressure on the inside of the door 1 that causes no leakage of air. FIG. 2*b* illustrates a door 1 with a certain air pressure on the outside of the door 1 and with a certain air pressure on the inside of the door 1 that causes some leakage of air. FIG. 2*c* illustrates a door 1 with a certain air pressure on the outside of the door 1 and with a certain air pressure on the inside of the door 1 that causes leakage of air.

The processing circuitry 102*a*, 102*b*, 102 is further configured to determine at least a first air pressure difference data 1*apdd* based on the difference between the at least first air pressure data 1*ap* and the at least second air pressure data 2*ap*, and in a determination that the at least first air pressure difference data 1*apdd* is outside of a predefined value, or a predefined value interval, generate a control signal CS for controlling the operation of the door 1. According to an aspect a value outside of a predefined value can be e.g. a value that is above a certain threshold value or a value that is below a certain threshold value.

According to an aspect the difference between the at least first air pressure data 1*ap* and the at least second air pressure data 2*ap* is described by the function 1*ap*-2*ap*=1*apdd*. In the example equation a positive value of 1*apdd* gives an indication that the 1*ap* is higher than the 2*ap*, in other words that the air pressure in the room 21, inside of the door 1 is higher than the air pressure in the second room 22, outside of the door 1. In an example a positive value of the at least first air pressure difference data 1*apdd* is desired in order to hinder particulates, such as dust, airborne organisms, or vaporized particles etc. to enter the room 21 with help from an air flow, if any, is in the direction from the room 21 to the second room 22.

According to an aspect the at least first seal 12*a*, 12*b* seals the door 1 when the at least first air pressure difference data 1*apdd* corresponds to a predefined value, or a predefined value interval. In an example the predefined value, or the predefined value interval, is tested when manufacturing and/or designing the door 1.

In an example, a higher air pressure onto the door 1 from the inside of the room 21 will cause a positive first air pressure difference data 1_apdd_ that makes the at least first seal 12_a_, 12_b_ to seal the door 1. However, in an example, a too high air pressure onto the door 1 from the inside of the room 21 will cause the at least first seal 12_a_, 12_b_ to be affected in a negative way that makes the at least first seal 12_a_, 12_b_ to leak air. Further a too high air pressure onto the door 1 from the inside of the room 21 may cause the at least first seal 12_a_, 12_b_ to be worn faster than expected. The predefined value, or the predefined value interval may therefore not allow a too high pressure onto the door 1 from the inside of the room 21, and hence a control signal CS for controlling the operation of the door 1 is generated. In an example a predefined value interval may allow a certain pressure onto the door 1 that is not too low, since that may cause a leak of air due to the at least first seal 12_a_, 12_b_ does not seal the room 21, but at the same time not allow a too high pressure onto the door 1 since in the example a too high pressure will have a negative impact on the at least first seal 12_a_, 12_b_ that may also cause a leak of air. According to an aspect the predefined value is a threshold value and the at least first seal 12_a_, 12_b_ seals the door 1 when the at least first air pressure difference data 1_apdd_ corresponds to a predefined value that is either below or over the threshold value.

In an example as illustrated in FIG. 2_a_, the at least first air pressure difference data 1_apdd_ indicates a value that causes no leak of air and hence no control signal CS for controlling the operation of the door 1 is generated.

In an example as illustrated in FIG. 2_b_, the at least first air pressure difference data 1_apdd_ indicates a value that causes some leakage of air from the room 21, on the inside of the door 1, to the second room 22 on the outside of the door 1. This hinder particulates, such as dust, airborne organisms, or vaporized particles etc. to enter the room 21 with help from the air flow that is in the direction from the room 21 to the second room 22. Therefore, in the example, no control signal CS for controlling the operation of the door 1 is generated.

In an example as illustrated in FIG. 2_c_, the at least first air pressure difference data 1_apdd_ indicates a negative value that causes leakage of air from the second room 22, on the outside of the door 1, to the room 21 on the inside of the door 1. This causes particulates, such as dust, airborne organisms, or vaporized particles etc. to enter the room 21 with help from the air flow that is in the direction from the second room 22 to the room 21. Therefore a control signal CS for controlling the operation of the door 1 is generated.

An advantage is hence that dependent on the air pressure on the outside of the door Zap and the air pressure on the inside of the door 1_ap_ the function of the door can be predicted and if the difference in the air pressure between the inside of the door and the air pressure of the outside of the door is outside of a desired value, the control signal CS can be used for controlling and/or confirming the function of the door. According to an aspect the control signal CS is configured to be received, via the communication network 50, by an electronic device, configured to control the operation of the door 1. In an example the control signal CS is configured to be received by a portable electronic device, such as a smartphone or a tablet as illustrated in FIG. 1_a_. In an example use case, any of a door vendor, a door service provider or a facility management provider is receiving the control signal CS.

According to an aspect, the processing circuitry 102_a_, 102_b_ is further configured to cause the door operation management system 100 to store at least any of the at least first air pressure data 1_ap_, the at least second air pressure data 2_ap_ and the at least first air pressure difference data 1_apdd_ together with a time stamp data in a memory 101_a_, 101_b_.

This means among others that the data can be used for processing at a later point of time, and i.e. that a history of how the air pressure has been affecting the door 1 over time becomes available.

According to an aspect the memory 101_a_, 101_b_ is a local memory 101_a_ installed in the vicinity of the door 1. According to an aspect the memory 101_a_, 101_b_ is a remote memory 101_b_ connected to the processing circuitry 102_a_, 102_b_ via the communication network 50.

According to an aspect the processing circuitry 102_a_, 102_b_ is further configured to cause the door operation management system 100 to determine the total time, or the number of times, the door 1 has been exposed to at least any of the at least first air pressure data 1_ap_, the at least second air pressure data 2_ap_ and the at least first air pressure difference data 1_apdd_, and in a determination that the total time, or the number of times, exceeds a predefined time value or a predefined number of times value, generate a maintenance signal MS for indicating a need for maintenance of the door 1.

Figure 3:
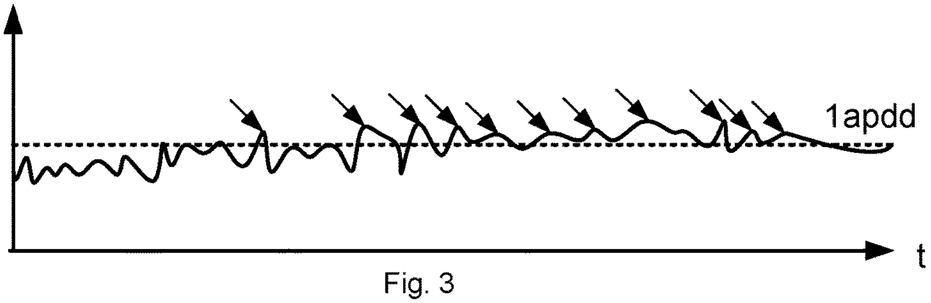
FIG. 3 illustrates an example graph visualizing historic air pressure difference data over time.
Figure 4:
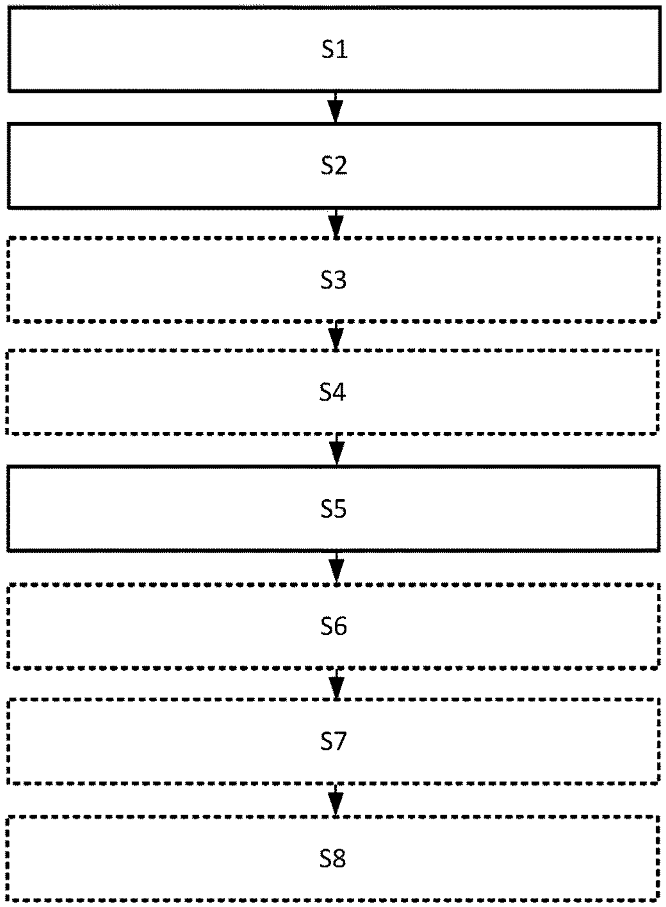
FIG. 4 illustrates a flow chart of the method steps according to some aspects of the disclosure.

FIG. 3 illustrates an example graph visualizing historic air pressure difference data over time. With the historic data it is possible to determine the total time, or the number of times, the door 1 has been exposed to certain air pressure difference data over time. In the example illustrated in FIG. 3, a threshold value that is illustrated with a horizontal dotted line, illustrates a count of the number of times the door 1 has been exposed to air pressure difference data that is above the threshold value, illustrated with arrows. In an example the at least first seal 12_a_, 12_b_ to the door 1 needs to be replaced after being exposed to a certain to air pressure a number of times and/or during a certain total time. In the example, a maintenance signal MS for indicating a need for maintenance of the door 1, is generated. In an example the maintenance signal MS is sent to an electronic device via the communication network 50. In an example the maintenance signal MS is configured to be received by a portable electronic device, such as a smartphone or a tablet as illustrated in FIG. 1_a_. In an example use case, any of a door vendor, a door service provider or a facility management provider is receiving the maintenance signal MS. In other words, the maintenance signal MS can be used for determining how the door 1 is worn, e.g. the number of times the door 1 has been opened and closed, and the number of times the door 1 has been affected by an air pressure that is e.g. above a certain value. This information is valuable for planning maintenance of the door, e.g. when it is time to change or service the seal 12_a_, 12_b_ that is making the door air tight, in order to secure that the door 1 is always functioning as expected.

According to an aspect the processing circuitry 102_a_, 102_b_ is further configured to cause the door operation management system 100 to obtain an indication of an open state or a closed state of the door 1 and in accordance with a determination that the door 1 is in an open state, as illustrated in FIG. 2_d_, use the control signal CS to generate an alarm for alerting that the door 1 is open, and in accordance with a determination that the door 1 is in a closed state, use the control signal CS to generate a maintenance signal MS for indicating a need for maintenance of the door 1. According to an aspect the door operation management system 100 further comprising a at least a first door open/close state sensor. According to an aspect the indication of an open state or a closed state of the door 1 is generated by a separate system connected to the door operation management system 100 via the communication network 50.

This means that when the control signal CS is generated, due to that the at least first air pressure difference data 1_apdd_ is outside of a predefined value, or a predefined value interval, the open state or closed state gives a further understanding of if an alarm should be generated, e.g. to alert users in the room 21 that the door is not closed, or if a maintenance signal MS should be generated in order to indicate a need to make maintenance of the door 1, e.g. to verify if the seal 12_a_, 12_b_ is functioning or need to be replaced. If the door is open, an alarm that alerts users in the vicinity of the door 1 can be alerted by at least any of a sound, light and tactile feedback so that the door can be closed by any of the users in the vicinity. However if the door is closed, there may be nothing that users in the vicinity of the door 1 can do, but instead the maintenance signal MS is generated for indicating a need for maintenance of the door 1.

According to an aspect the processing circuitry 102_a_, 102_b_ is further configured to cause the door operation management system 100 to send the control signal CS to a door actuator device 25 configured to close and/or open the door 1.

FIGS. 1_a_ and 1_b_ illustrates a door actuator device 25. In an example the door actuator device 25 is connected to at least any of a motor, a pneumatic or a hydraulic device configured to move the door 1 between an open and a closed position and further configured to apply a closing operation that causes the door 1 to be exposed to a further force that press the door 1 against any of the walls 2,3 and or a doorframe for making the door 1 airtight.

An advantage with this aspect is that the door 1 can then automatically be made more airtight by the door actuator device 25 by e.g. applying a closing operation onto the door 1, e.g. by motors closing the door 1, when the door actuator device 25 receives the control signal CS.

According to an aspect the processing circuitry 102_a_, 102_b_ is further configured to cause the door operation management system 100 to determine, based on the at least first air pressure data 1_ap_ and the at least second air pressure data 2_ap_, a relative force applied onto the door 1, for controlling the door actuator device 25 to close and/or open the door 1 dependent on the relative force. In other words, by knowing the relative force, e.g. either applied from the inside of the door 1 or from the outside of the door 1, the door actuator device 25 can be instructed to use a certain torque or a certain power to close and/or open the door 1. This can be used to save energy but also to make the user experience of the operation of the door more smooth.

According to an aspect the door operation management system 100 comprises a plurality of doors and each door is connected to the door operation management system 100 via a communication network 50. This means that a plurality of doors can be managed by the same door operation management system 100 which enables a flexible configuration of plural doors.

According to an aspect the control signal CS is configured to be received by a facility management system for controlling the ventilation of the room. The advantage with this aspect is that e.g. the ventilation of the room where the door 1 is used can be controlled, with knowledge of the air pressure on the outside of the door Zap and the air pressure on the inside of the door 1_ap_.

The disclosure further proposes a method for controlling the operation of a door 1 to a room. The method comprising the step of S1 obtaining at least a first air pressure data 1_ap_ based on an air pressure on the inside of the door 1, the step of S2 obtaining at least a second air pressure data 2_ap_ based on the air pressure on the outside of the door 1. The method further comprising the step of S5 determining at least a first air pressure difference data 1_apdd_ based on the difference between the at least first air pressure data 1_ap_ and the at least second air pressure data 2_ap_, and in a determination that the at least first air pressure difference data 1_apdd_ is outside of a predefined value, or a predefined value interval, generate a control signal CS for controlling the operation of the door 1. According to an aspect a value outside of a predefined value can be e.g. a value that is above a certain threshold value or a value that is below a certain threshold value. An advantage is hence that dependent on the air pressure on the outside of the door Zap and the air pressure on the inside of the door 1_ap_ the function of the door can be predicted and if the difference in the air pressure between the inside of the door and the air pressure of the outside of the door is outside of a desired value, the control signal CS can be used for controlling and confirming the function of the door.

According to an aspect the method further comprising the step of S3 storing at least any of the at least first air pressure data 1_ap_, the at least second air pressure data 2_ap_ and the at least first air pressure difference data 1_apdd_ together with a time stamp data in a memory 101_a_, 101_b_. This means among others that the data can be used for processing at a later point of time, and i.e. that a history of how the air pressure has been affecting the door 1 over time becomes available.

According to an aspect the method further comprising the step of S4 determining the total time, or the number of times, the door 1 has been exposed to at least any of the at least first air pressure data 1_ap_, the at least second air pressure data 2_ap_ and the at least first air pressure difference data 1_apdd_, and in a determination that the total time, or the number of times, exceeds a predefined time value or a predefined number of times value, generate a maintenance signal MS for indicating a need for maintenance of the door 1. In other words, it can be predicted how the door 1 is worn, e.g. the number of times the door 1 has been opened and closed, and the number of times the door 1 has been affected by an air pressure that is e.g. above a certain value. This information is valuable for planning maintenance of the door, e.g. when it is time to change or service the seal 12_a_, 12_b_ that is making the door air tight, in order to secure that the door 1 is always functioning as expected.

According to an aspect the method further comprising the step of S6 obtaining an indication of an open state or a closed state of the door 1 and in accordance with a determination that the door 1 is in an open state, use the control signal CS to generate an alarm for alerting that the door 1 is open, and in accordance with a determination that the door 1 is in a closed state, use the control signal CS to generate a maintenance signal MS for indicating a need for maintenance of the door 1. This means that when the control signal CS is generated, due to that the at least first air pressure difference data 1_apdd_ is outside of a predefined value, or a predefined value interval, the open state or closed state gives a further understanding of if an alarm should be generated, e.g. to alert users in the room 21 that the door is not closed, or if a maintenance signal MS should be generated in order to indicate a need to make maintenance of the door 1, e.g. to verify if the seal 12_a_, 12_b_ is functioning or need to be replaced.

According to an aspect the method further comprising the step of S7 sending the control signal CS to a door actuator device 25 configured to close and/or open the door 1. An advantage with this aspect is that the door 1 can then automatically be made more air tight by the door actuator device 25 by e.g. applying a close operation onto the door 1, e.g. by motors closing the door 1, when the door actuator device 25 receives the control signal CS.

According to an aspect the method further comprising the step of S8 determining, based on the at least first air pressure data 1*ap* and the at least second air pressure data 2*ap*, a relative force applied on the door 1 for controlling the door actuator device 25 to close and/or open the door 1. In other words, by knowing the relative force, e.g. either applied from the inside of the door 1 or from the outside of the door 1, the door actuator device 25 can be instructed to use a certain torque or a certain power to close and/or open the door 1. This can be used to save energy but also to make the user experience of the operation of the door more smooth.

Figure 5:
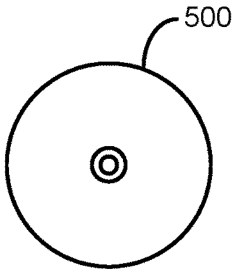
FIG. 5 illustrates a computer program product according to some aspects of the disclosure.

The disclosure further proposes, as illustrated in FIG. 5, a computer program product 500 comprising a non-transitory computer readable medium, having thereon a computer program comprising program instructions, the computer program being loadable into a processing circuitry 102*a*, 102*b* and configured to cause execution of the method when the computer program is run by the at least one processing circuitry 102*a*, 102*b*.

According to an aspect the door operation management system 100 is configured to carry out any or more of the aspects of the described method. According to an aspect of the disclosure, the method is carried out by instructions in a software program that is downloaded and run in the door operation management system 100.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A door operation management system for controlling the operation of a door to a room, the door operation management system comprises:

at least a first sensor device configured to obtain at least a first air pressure data (1*ap*) based on the air pressure on the inside of a door and at least a second air pressure data (2*ap*) based on the air pressure on the outside of the door, wherein the door is separating the room from a second room, and wherein in a closed state the door seals or partially seals the room from the second room;

a processing circuitry operatively connected to the at least first sensor device configured to cause the door operation management system to:

obtain the at least first air pressure data (1*ap*) based on the air pressure on the inside of a door;

obtain the at least second air pressure data (2*ap*) based on the air pressure on the outside of the door; and determine at least a first air pressure difference data (1*apdd*) based on the difference between the at least first air pressure data (1*ap*) and the at least second air pressure data (2*ap*), and in a determination that the at least first air pressure difference data (1*apdd*) is outside of a predefined value, or a predefined value interval, generate a control signal (CS) for controlling the operation of the door, and determine a total time, or a number of times, the door has been exposed to at least one of the at least first air pressure data (1*ap*), the at least second air pressure data (2*ap*) and the at least first air pressure difference data (1*apdd*), and in a determination that the total time, or the number of times, exceed predefined time value or a predefined number of times value, generate a maintenance signal (MS) for indicating a need for maintenance of the door.

2. The door operation management system according to claim 1, wherein the processing circuitry is further configured to cause the door operation management system to:

store at least any of the at least first air pressure data (1*ap*), the at least second air pressure data (2*ap*) and the at least first air pressure difference data (1*apdd*) together with a time stamp data in a memory.

3. The door operation management system according to claim 1, wherein the processing circuitry is further configured to cause the door operation management system to:

obtain an indication of an open state or a closed state of the door and in accordance with a determination that the door is in the open state, use the control signal (CS) to generate an alarm for alerting that the door is open; and in accordance with a determination that the door is in the closed state, use the control signal (CS) to generate a maintenance signal (MS) for indicating a need for maintenance of the door.

4. The door operation management system according to claim 1, wherein the processing circuitry is further configured to cause the door operation management system to:

send the control signal (CS) to a door actuator device configured to close and/or open the door.

5. The door operation management system according to claim 4, wherein the processing circuitry is further configured to cause the door operation management system to:

determine, based on the at least first air pressure data (1*ap*) and the at least second air pressure data (2*ap*), a relative force applied onto the door, for controlling the door actuator device to close and/or open the door dependent on the relative force.

6. The door operation management system according to claim 1, wherein the door operation management system comprises a plurality of doors and each door is connected to the door operation management system via a communication network.

7. The door operation management system according to claim 1, wherein the control signal (CS) configured to be received by a facility management system for controlling the ventilation of the room.

8. A method for controlling the operation of a door to a room, the method comprising:

obtaining at least a first air pressure data (1*ap*) based on an air pressure on the inside of the door;

obtaining at least a second air pressure data (2*ap*) based on the air pressure on the outside of the door, wherein a closed state the door seals or partially seals space on the inside of the from the space on the outside of the room;

determining at least a first air pressure difference data (1*apdd*) based on the difference between the at least first air pressure data (1*ap*) and the at least second air pressure data (2*ap*), and in a determination that the at least first air pressure difference data (1*apdd*) is outside of a predefined value, or a predefined value interval, generate a control signal (CS) for controlling the operation of the door; and determining a total time, or a number of times, the door has been exposed to least one of the at least first air pressure data (1*ap*), the at least second air pressure (2*ap*) and the at least first air pressure difference data (1*apdd*), and in a determination that the total time, or the number of times, exceeds a predefined time value or a predefined number of times value, generate a maintenance signal (MS) for indicating a need for maintenance of the door.

9. The method according to claim 8, further comprising: storing at least any of the at least first air pressure data (1*ap*), the at least second air pressure data (2*ap*) and the at least first air pressure difference data (1*apdd*) together with a time stamp data in a memory.

10. The method according to claim 8, further comprising: obtaining an indication of an open state or a closed state of the door and in accordance with a determination that the door is in the open state, use the control signal (CS) to generate an alarm for alerting that the door is open; and in accordance with a determination that the door is in the closed state, use the control signal (CS) to generate a maintenance signal (MS) for indicating a need for maintenance of the door.

11. The method according to claim 8, further comprising: sending the control signal (CS) to a door actuator device configured to close and/or open the door.

12. The method according to claim 8, further comprising: determining, based on the at least first air pressure data (1*ap*) and the at least second air pressure data (2*ap*), a relative force applied on the door for controlling a door actuator device to close and/or open the door.

13. A computer program product comprising a non-transitory computer readable medium, having thereon a computer program comprising program instructions, the computer program being loadable into a processing circuitry and configured to cause execution of the method according to claim 8 when the computer program is run by the at least one processing circuitry.

* * * * *